Dec. 9, 1930.  A. E. JONES  1,784,011
DEVICE FOR CARRYING HEAVY BODIES ON, AND RELEASING THEM FROM AIRCRAFT
Filed July 22, 1930   2 Sheets-Sheet 1
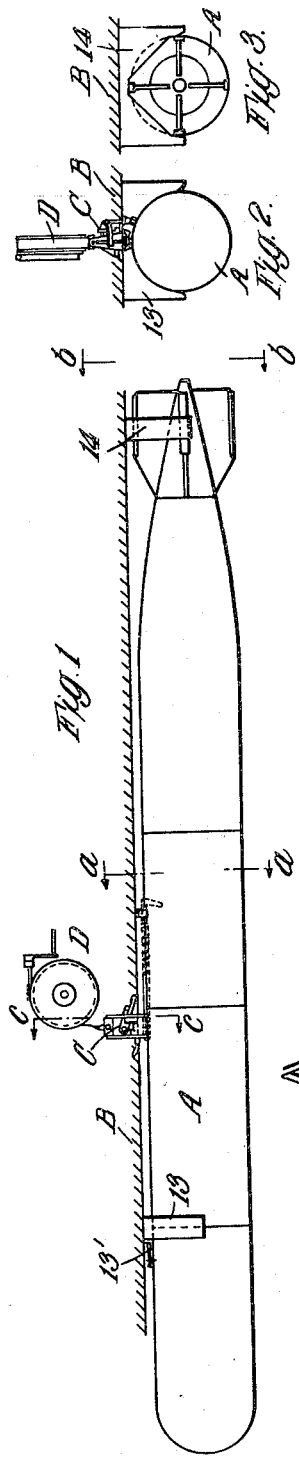
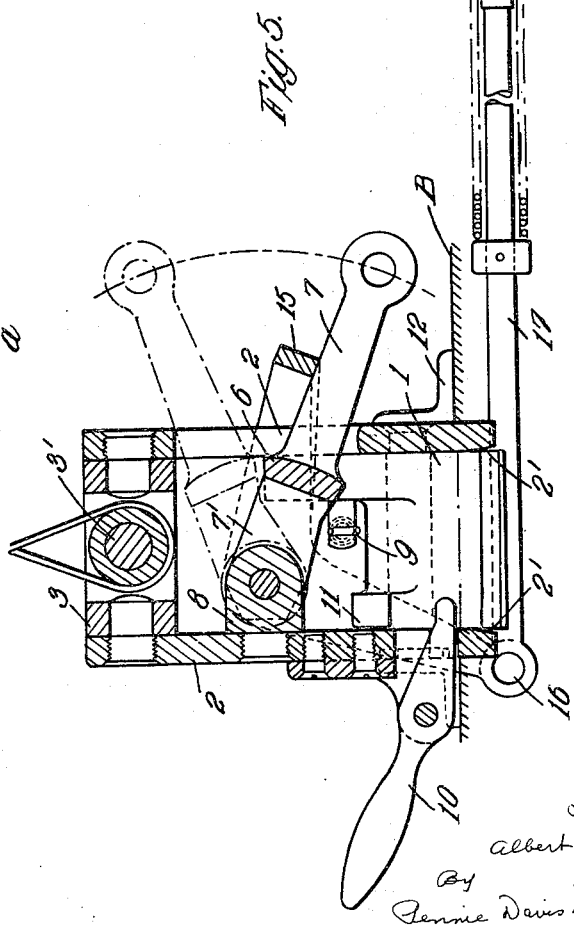
Inventor:
Albert Edward Jones
By
Pennie Davis Marvin & Edmonds
Attorneys

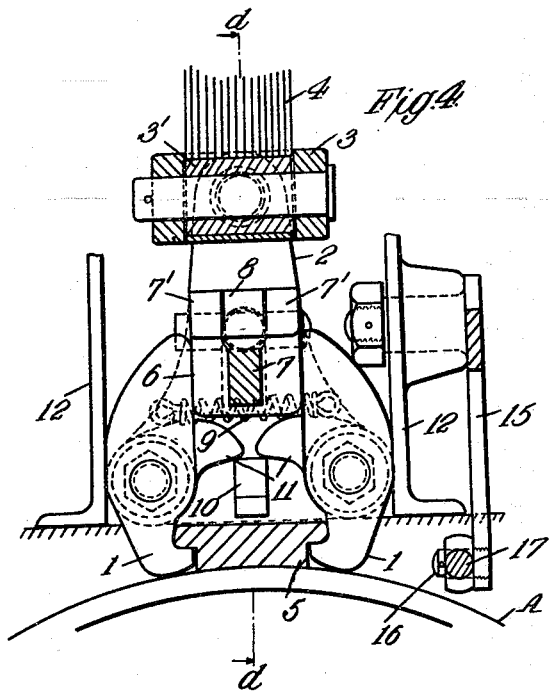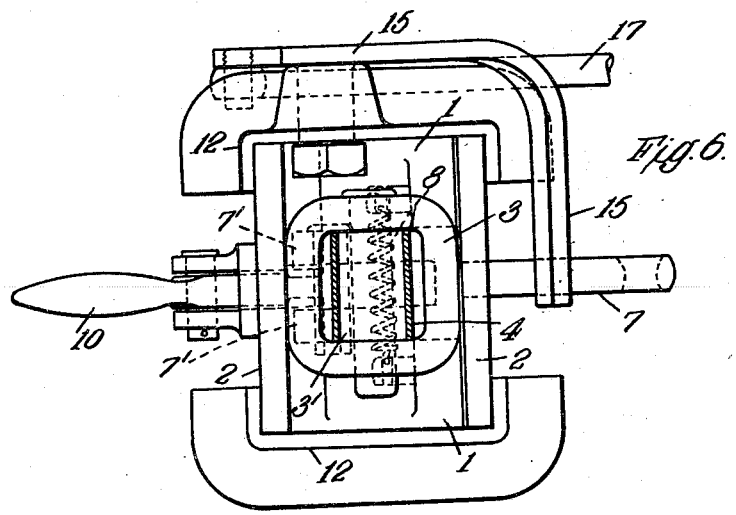

Patented Dec. 9, 1930

1,784,011

UNITED STATES PATENT OFFICE

ALBERT EDWARD JONES, OF WESTMINSTER, LONDON, ENGLAND, ASSIGNOR TO VICKERS-ARMSTRONGS LIMITED, OF WESTMINSTER, ENGLAND, A BRITISH COMPANY

DEVICE FOR CARRYING HEAVY BODIES ON AND RELEASING THEM FROM AIRCRAFT

Application filed July 22, 1930, Serial No. 469,874, and in Great Britain December 4, 1928.

This invention relates to devices for carrying heavy bodies on, and releasing them from, aircraft and of the kind comprising two pivoted claws or hooks which are adapted to engage with opposite sides of part of the body and which are held in their engaging position by a rocking member disposed between parts of the claws or hooks; the invention has particular reference to such devices for use with automobile torpedoes carried by seaplanes.

According to the invention the pivoted claws or hooks are held in their engaging position by a rocking block which is disposed between upward extensions of the said claws so as to move in a plane transverse to the plane of movement of the claws and is so constructed that it retains the claws in their fully engaging position during a substantial movement of the said block, thereby avoiding the possibility of the claws being released by a small movement of the block and also enabling a member moving with the block to actuate further mechanism prior to the release of the said claws. The said block is connected to a releasing member and when the latter is operated to withdraw the block from its retaining position between the said portions of the claws, the latter move into their disengaging position with respect to the part of the body with which they engage and the said body is thereby released. This disengaging movement of the claws may be effected by the weight of the body operating through surfaces formed on the claws and on the part of the body with which they engage and by a spring (which is preferably a helical tension spring connected at its ends to the upper parts of the claws). The claws are preferably pivoted in end plates constituting part of a frame carrying at its upper end a Hooke's joint. One member of this jaw is attached to a hoisting band or rope which leads to a winch on the aircraft as is known per se. The part of the body with which the claws engage is preferably in the form of a longitudinally arranged T-shaped member at the upper part of the body, the said claws engaging beneath each projecting side of the said member. To hold the body against endwise movement with respect to the said frame the lower parts of the latter may engage with the ends of the said T-shaped member and the said lower parts being, if desired, chamfered or bevelled.

In order that the said invention may be clearly understood and readily carried into effect the same will now be described more fully with reference to the accompanying drawings illustrating a preferred embodiment of the invention applied to the carrying of an automobile torpedo by, and releasing it from, a seaplane and in which:—

Figure 1 is a diagrammatic elevation of a torpedo suspended below a part of the framework of a seaplane.

Figures 2 and 3 are end elevations looking in the direction of the arrows $a, a$ and $b, b$ respectively in Figure 1.

Figure 4 is a section on the line $c, c$ in Figure 1 drawn to an enlarged scale.

Figure 5 is a section on the line $d, d$ in Figure 4 and,

Figure 6 is a partial plan view of Figure 5.

Referring to Figures 1 and 2, A is an automobile torpedo suspended below a part of the framework B of a seaplane by means of the carrying and releasing device C associated with the winch D mounted on the said framework B. The device C comprises two claws or hooks 1 (see Figures 4 and 5) pivoted in end plates 2 which constitute part of the frame carrying at its upper end the Hooke's joint 3, to the inner member $3^1$ of which the hoisting band or rope 4 is attached, this band or rope leading to the winch D (see Figures 1 and 2). The claws or hooks 1 are adapted to engage beneath the projecting sides of the longitudinally arranged T-shaped member 5 formed at the upper part of the torpedo A. The said claws can be held in their engaging position by the block 6 which forms part of the releasing member 7. The said member 7 is formed at its inner end with two forked arms $7^1$ which are pivotally secured to a lug 8 carried by one of the end plates 2. By angular movement of the member 7 about its pivot the said block 6 can be moved into and out of engagement with the upper parts of the claws or hooks 1 when the latter are in their engaging position. In the construction illustrated (see Figure 5) by reason of the comparatively large cross section of the block 6 an angular movement of the member 7 of approximately 45° is necessary for the release of the claws 1. This arrangement mitigates the possibility of an accidental release of the said claws and, at the same time, enables further mechanism to be actuated prior to the release of the torpedo as hereinafter described. Upon the completion of the releasing movement of the member 7, the said claws are caused to move into their disengaging position with respect to the T-shaped member 5 by the weight of the torpedo A operating through the inter-engaging surfaces formed on the claws 1 and on the T-shaped member 5, such movement being also assisted by a helical tension spring 9 connected at its ends with the upper parts of the claws.

For the purpose of lifting the torpedo A into position the device C is lowered by the aforesaid winch D into position over the torpedo, the block 6 being out of engagement with the claws 1 which are consequently kept open by the spring 8. When the said claws have been positioned over the aforesaid T-shaped member they are closed by manual actuation of a lever 10 pivoted to one of the end plates 2 and engaging at its inner end with two inwardly projecting lugs 11 formed on the claws 1; the closing movement of the latter taking place against the resistance of the spring 9. As soon as the claws are closed over the T-shaped member 5 the block 6 falls or is moved into its retaining position between the upper portions of the claws and the device C is then raised by the winch D into a housing 12 disposed on the aircraft and which holds the device against endwise and lateral movement. In order to hold the torpedo A against endwise movement with respect to the claws 1 the lower portions of the end plates 2 engage with the ends of the T-shaped member 5, the said ends and the lower portion of the end plates being, if desired chamfered or bevelled as at $2^1$ (see Figure 5). As a further support for the torpedo, chocks 13 and 14 are provided on the framework B which are adapted to bear against forward and rear parts respectively of the torpedo when the latter is in position, the chock 13 being provided with an extension $13^1$ which prevents the usual safety fan or blade (not shown) appertaining to the pistol or firing gear of the torpedo from moving.

In order that the releasing movement of the aforesaid releasing member 7 shall start the engine prior to the release of the torpedo when the device C is in position within the housing 12, the said member 7 is arranged to bear against one arm of a bell crank lever 15 pivoted at 16 to the housing 12, the other arm of this lever being in pivotal engagement with and operating a spring controlled rod 17 which bears at its rear end against the starting lever 18 of the torpedo shown in "dot" and "dot and dash" lines in Figure 5, the parts being so arranged that the starting lever 18 is moved to its starting position just before the block 6 moves out of engagement with the portions of the claws between which it is normally situated.

What I claim and desire to secure by Letters Patent of the United States is:—

1. A device for carrying heavy bodies on, and releasing them from, aircraft, comprising in combination two pivoted claws, upward extensions of said claws, a rocking block disposed between said extensions and arranged to move in a plane transverse to the plane of movement of said claws, means for moving said block to release the claws and means whereby said block retains said claws in their engaging position during a substantial movement of said block.

2. A device for carrying heavy bodies on, and releasing them from, aircraft, comprising in combination with the elements claimed in claim 1, of spring means for moving said claws into their disengaging position when released by said block.

3. A device for carrying heavy bodies on, and releasing them from, aircraft, comprising in combination with the elements claimed in claim 1, of a frame to which said claws and block are pivoted, and extensions of said frame for contacting with the end faces of part of the suspended body to prevent endwise movement of said body.

4. A device for carrying heavy bodies on, and releasing them from, aircraft, comprising in combination with the elements claimed in claim 1, of a frame to which said claws and block are pivoted, and extensions of said frame for contacting with the end faces of part of the suspended body to prevent endwise movement of said body and a Hooke's joint carried by said frame, said Hooke's joint being for connection to a flexible member wound around a winch on the aircraft.

5. A device for carrying heavy bodies on, and releasing them from, aircraft, comprising in combination with the elements claimed in claim 1, of an auxiliary device and means whereby the movement of the block operating means prior to the release of the claws effects the operation of said auxiliary device.

6. A device for carrying heavy bodies on and releasing them from, aircraft, comprising in combination with the elements claimed in claim 1, of manually operated means for moving said claws into their engaging position to permit said block being placed between them.

ALBERT EDWARD JONES.